United States Patent [19]

Suzuki et al.

[11] Patent Number: 4,725,519
[45] Date of Patent: Feb. 16, 1988

[54] DUAL LAYER ELECTROPHOTOGRAPHIC PHOTORECEPTOR COMPRISES TITANIUM PHTHALOCYANINE CHARGE GENERATOR AND HYDRAZONE CHARGE TRANSPORT MATERIALS

[75] Inventors: Tetsumi Suzuki, Isehara; Tetsuo Murayama, Machida; Hitoshi Ono, Yokohama; Shigenori Otsuka, Omiya; Mamoru Nozomi, Yokohama, all of Japan

[73] Assignee: Mitsubishi Chemical Industries Ltd., Tokyo, Japan

[21] Appl. No.: 782,684

[22] Filed: Oct. 1, 1985

[30] Foreign Application Priority Data

Nov. 1, 1984 [JP] Japan ................... 59-230982

[51] Int. Cl.$^4$ .............................. G03G 5/06
[52] U.S. Cl. ...................... 430/58; 430/78; 430/79
[58] Field of Search ................. 430/78, 58, 59

[56] References Cited

U.S. PATENT DOCUMENTS

| | | | |
|---|---|---|---|
| 3,357,989 | 12/1967 | Bryne et al. | 540/122 |
| 3,926,629 | 12/1975 | Weigl | 430/41 |
| 4,106,935 | 8/1978 | Petruzzella | 430/64 |
| 4,214,907 | 7/1980 | Nakazawa et al. | 430/58 |
| 4,226,928 | 10/1980 | Nakazawa et al. | 430/81 |
| 4,642,280 | 2/1987 | Ueda | 430/73 |

FOREIGN PATENT DOCUMENTS

| | | |
|---|---|---|
| 3019395 | 11/1980 | Fed. Rep. of Germany . |
| 3311485 | 9/1983 | Fed. Rep. of Germany . |
| 49-11136 | 1/1974 | Japan . |
| 59-49544 | 3/1984 | Japan . |
| 59-166959 | 9/1984 | Japan . |
| 60-191263 | 9/1985 | Japan . |
| 1268422 | 3/1972 | United Kingdom . |

OTHER PUBLICATIONS

Patent Abstracts of Japan, vol. 6, No. 252 (P-161) [1130], Dec. 10, 1982.
Patent Abstracts of Japan, vol. 8, No. 129 (P-280) [1566], Jun. 15, 1984.

*Primary Examiner*—J. David Welsh
*Attorney, Agent, or Firm*—David G. Conlin; Linda M. Buckley; George W. Neuner

[57] ABSTRACT

A dual layer photoreceptor for use in electrophotography, wherein a charge transport layer containing a hydrazone compound and a binder polymer is laminated on a charge generation layer containing a titanium phthalocyanine compound of the formula:

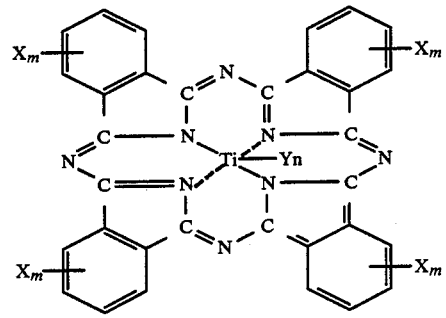

wherein X represents hydrogen atom, lower alkyl group, lower alkoxy group, allyloxy group, nitro group, cyano group, hydroxy group, benzyloxy group or halogen atom, Y represents halogen atom, alkoxy group or oxygen atom, n represents an integer of 1 or 2 and m represents an integer of 0 to 4, and a binder polymer, formed on an electroconductive substrate.

3 Claims, No Drawings

DUAL LAYER ELECTROPHOTOGRAPHIC PHOTORECEPTOR COMPRISES TITANIUM PHTHALOCYANINE CHARGE GENERATOR AND HYDRAZONE CHARGE TRANSPORT MATERIALS

BACKGROUND OF THE INVENTION

This invention relates to a dual layer photoreceptor for use in electrophotography having a high sensitivity upto the near infrared wavelength region.

Heretofore, inorganic photoconductive materials such as selenium, cadmium sulfide and zinc oxide have widely been used for photoreceptors for electrophotography.

Moreover, organic photoconductive materials represented by polyvinylcarbazole have been investigated as well to be applied to the photoreceptors for electrophotography, and several of them have already been put into practical use.

The organic photoconductive materials have various merits, for example, in that they are reduced in weight, can be formed into films without difficulty and facilitate the production of the photoreceptor as compared with the inorganic materials.

Along with the recent prevalency of laser beam printer or the like that uses a laser beam as light source instead of conventional incandescent light and has advantages in higher printing speed, higher picture quality and non-impact printing, development for photosensitive materials capable of satisfying the requirements therefor has been demanded.

A semiconductor laser has been remarkably developed in recent years among the laser beams. In this case, since the wavelength of the semiconductor laser is around 800 nm, a photoconductive material of a property highly sensitive to the long wavelength ray around 800 nm has strongly been desired.

As the organic substance capable of satisfying the above-mentioned requirement, there have been known squaric acid methine dye, indoline dye, cyanine dye, pyrylium dye, polyazo dye, phthalocyanine dye, naphthoquinone dye and the like. However, at the present stage, the squaric acid methine dye, indoline dye, cyanine dye and pyrylium dye are insufficient in the practical stability, i.e., cyclic characteristics although they are adaptable to the longer wavelength, the polyazo dye is less adaptable to the longer wavelength and disadvantageous in view of the production thereof and the naphthoquinone dye is disadvantageous in view of the sensitivity.

The photoreceptor composed of a metal phthalocyanine compound among the phthalocyanine dyes, has a sensitivity peak at a relatively longer wavelength region of from 700 to 750 nm, while it somewhat varies depending on the central metal, as described in U.S. Pat. No. 3,357,989, Japanese Patent Application Laid-Open No. 11136/1974, U.S. Pat. No. 4,214,907 and British Patent No. 1268422, etc. However, the sensitivity is gradually reduced in excess of 750 nm, and turned into no more practically effective level.

Japanese Patent Application Laid-Open No. 49544/1984 describes an electrophotographic photoreceptor in which titanium phthalocyanine is vapor-deposited on a substrate to prepare a charge generation layer, and a charge transport layer mainly composed of 2,6-dimethoxy-9,10-dihydroxyanthracene is prepared by coating. However, this photoreceptor material has a high residual potential to suffer from an unfavorable restriction to some extent in the practical use, and is less advantageous in view of the reproducibility of various electric properties due to the unevenness in the film thickness formed by the vapor-deposition. Furthermore, it bears some inevitable restrictions in the mass production of the photoreceptor in industrial scale. On the other hand, problems are resulted to the photoreceptor itself such as occurrence of interference fringe mainly attributable to the reflection of the laser beam on the substrate at the time of the exposure, while several technics have been known as the countermeasures therefor.

As one of such measures, there has been known a method of increasing the thickness of the charge generation layer to absorb the exposing laser beam, thereby eliminating the reflection from the substrate. But there is a limit to the thickness of the film that can be formed by the conventional vapor-deposition process and the thickness control is also difficult.

On the contrary, a method of preparing the charge generation layer by coating pigment dispersed binder solution is advantageous since this method can prepare the layer with an optional thickness at good reproducibility under easy control, requires no high vacuum system for the vapor-deposition, can avoid heat decomposition or degradation while heating, and additionally it is free from cumbersome procedures in the industrial production such as crystallization of vapor-deposited products in various ways after vapor-deposition as in the vapor deposition process.

The object of the present invention is to provide an organic photoconductive material capable of producing the photoreceptor having a high sensitivity at around 800 nm, while having a desired charging property, extremely low residual potential and satisfactory durability.

SUMMARY OF THE INVENTION

The aimed object of this invention can be attained by coating a binder solution containing titanium phthalocyanine as the charge generation material to form the charge generation layer and, further, by incorporating a hydrazone compound among various known materials as the charge transport material of the charge transport layer formed on the charge generation layer.

Specifically, the feature of this invention lies in a dual layer photoreceptor for use in electrophotography, wherein a charge transport layer is formed on a charge generation layer overlaid on an electroconductive support, characterized in that the charge generation layer contains a titanium phthalocyanine compound represented by the following general formula I:

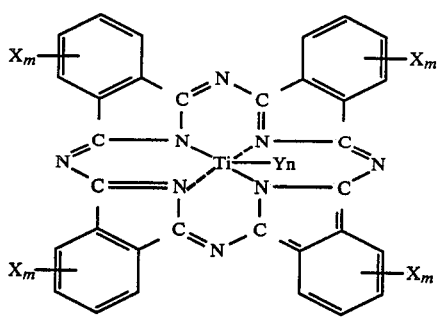

wherein X represents a hydrogen atom, a lower alkyl group, a lower alkoxy group, an allyloxy group, a nitro group, a cyano group, a hydroxy group, a benzyloxy group or a halogen atom, Y represents a halogen atom, an alkoxy group or an oxygen atom, n represents an integer of 1 or 2 and m represents an integer from 0 to 4, and a binder polymer, and that the charge transport layer contains a hydrazone compound and a binder polymer.

DETAILED DESCRIPTION OF THE INVENTION

Referring now more specifically to this invention, the titanium phthalocyanine contained in the photoconductor layer of the electrophotographic photoreceptor according to this invention is represented by the above-mentioned general formula I.

In the general formula I, X represents a hydrogen atom; a lower alkyl group such as methyl group and ethyl group; a lower alkoxy group such as methoxy group and ethoxy group; an allyloxy group; a nitro group; a cyano group; a hydroxy group; a benzyloxy group; or a halogen atom such as bromine atom or chlorine atom. Y represents a halogen atom such as chlorine atom and bromine atom; an alkoxy group such as methoxy group and ethoxy group; or an oxygen atom.

Those in which X represents hydrogen atom or methyl group and Y represents an oxygen atom are particularly preferred.

The titanium phthalocyanine may be synthesized in accordance with the known reaction scheme as described below.

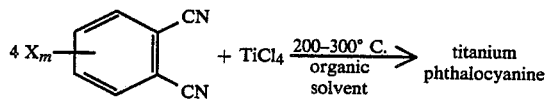

Preferred organic solvents have high boiling points and are inert to the reaction, such as quinoline, α-chloronaphthalene, β-chloronaphthalene, α-methylnaphthalene, methoxynaphthalene, diphenyl ether, diphenyl methane, diphenyl ethane, ethylene glycol, dialkyl ether and higher aliphatic amines. A desired reaction temperature is usually from 200° C. to 300° C. As the case may be, the reaction may be proceeded by heating to a temperature higher than 160° C. without the solvent.

In accordance with the above-mentioned reaction scheme, the resulted titanium phthalocyanine compound is in the form of PcTiCl$_2$ wherein Pc represents the phthalocyanine residue, but PcTiO is also formed partially through the hydrolysis and the product is usually obtained as the mixture thereof. Complete hydrolysis may also be attained by aqueous ammonia treatment (at 100° C.) or the like (refer to Japanese Patent Application Laid-Open No. 166959/1984).

As the starting phthalonitrile, known o-dicarboxylic acids, phthalic acid anhydrides, phthalimides and phthalic diamides may also be used.

The titanium phthalocyanine compound obtained as described above can be purified in the same manner as in general organic dyes through known methods such as sublimation, recrystallization, treatment with organic solvent, heat suspending purification with high boiling organic solvent, re-precipitation after dissolution with sulfuric acid, alkali washing, etc. The purification is applied not only for the removal of impurities but also for the hydrolysis of PcTiCl$_2$ Since electrical properties of the phthalocyanine compound obtained in accordance with the foregoing reaction scheme are significantly varied, it is preferred to use such purified phthalocyanine.

The organic solvent usable for the organic solvent treatment and heat suspending purification may include xylene, naphthalene, toluene, monochlorobenzene, trichlorobenzene, o-dichlorobenzene, chloroform, tetrachloroethane, acetoamide, N,N-dimethylformamide, N,N-dimethylacetoamide, N-methylpyrrolidone, etc., as well as those organic solvents used in the aforementioned reaction, water, and other organic solvents such as methanol, ethanol, propanol, butanol, pyridine, acetone, methyl ethyl ketone and tetrahydrofuran. High boiling organic solvent such as N-methylpyrrolidone is particularly preferred for the heat suspending purification.

The binder polymer may include polymer or copolymer of vinyl compound such as styrene, vinyl acetate, methyl acrylate, ethyl acrylate, benzyl acrylate and methacrylate; polyester; polycarbonate; polysulfone; polyvinyl butyral; phenoxy resin; cellulose resins such as cellulose ester and cellulose ether; urethane resin and epoxy resin. The amount of the binder polymer to be incorporated usually ranges from 0.1 to 5 times by weight of the titanium phthalocyanine compound.

It is desired that the phthalocyanine compound is present in the form of minute particles of less than 1 μm in the binder.

The hydrazone compound as the main ingredient in the charge transport layer is represented by the following general formula IIA or IIB:

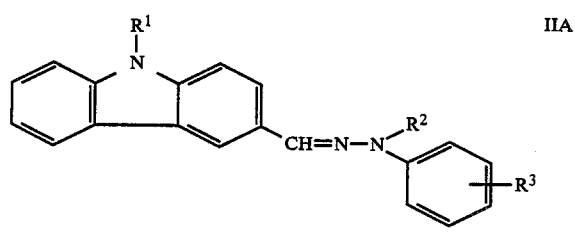

wherein R$^1$ represents an alkyl group such as methyl group, ethyl group and butyl group, a substituted alkyl group, an aralkyl group such as benzyl group, an allyl group or an alkoxycarbonyl ethyl group such as methoxycarbonyl ethyl group, ethoxycarbonyl ethyl group and butoxycarbonyl ethyl group, R$^2$ represents an alkyl group such as methyl group, ethyl group, propyl group and butyl group, an allyl group, a substituted alkyl group, a phenyl group, a naphthyl group or an aralkyl group such as benzyl group, $R^3$ represents a hydrogen atom, an alkyl group such as methyl group and ethyl group, an alkoxy group such as methoxy group and ethoxy group, or a halogen atom such as chlorine atom and bromine atom; and

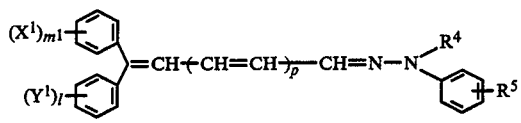
IIB wherein $X^1$, $Y^1$ and $R^5$ each represents a hydrogen atom, a lower alkyl group such as methyl group, ethyl group, propyl group, butyl group and hexyl group, a dialkyl amino group such as dimehylamino group and diethylamino group, a lower alkoxy group such as methoxy group, ethoxy group, propoxy group and butoxy group, or an aryl alkoxy group such as phenoxy group, benzyloxy group and phenethyloxy group, $R^4$ represents a hydrogen atom, a lower alkyl group such as methyl group, ethyl group, propyl group, butyl group and hexyl group, an allyl group, a phenyl group, or an aralkyl group such as benzyl group and phenethyl group, $m^1$ and l each represents an integer of 1 or 2 and p represents an integer of 0 or 1.

Particularly preferred are those represented by the general formula IIA in which $R^1$ represents methyl group or ethyl group, $R^2$ represents methyl group or phenyl group and $R^3$ represents hydrogen atom, or those represented by the general formula IIB in which $X^1$ and $Y^1$ each represents methoxy group, $R^4$ represents methyl group or phenyl group, $R^5$ represents hydrogen atom, $m^1$ and l each represents 1 and p represents 0.

Examples of the hydrazone compound indicatively shown in Tables 1 and 2 below.

TABLE 1

| Compound No. | $R^1$ | $R^2$ | $R^3$ |
|---|---|---|---|
| 13 | —CH$_3$ | –⟨phenyl⟩ | —H |
| 14 | —C$_2$H$_5$ | –⟨phenyl⟩ | —H |
| 15 | —C$_3$H$_7^{(n)}$ | —CH$_3$ | —H |
| 16 | —C$_2$H$_5$ | —CH$_3$ | —H |
| 17 | —C$_2$H$_5$ | –⟨phenyl⟩ | —CH$_3$ |
| 18 | —C$_2$H$_5$ | –⟨naphthyl⟩ | —H |

TABLE 2

| Compound No. | $X^1$ | $m^1$ | $Y^1$ | l | p | $R^4$ | $R^5$ |
|---|---|---|---|---|---|---|---|
| 19 | —OCH$_3$ | 1 | —OCH$_3$ | 1 | 0 | –⟨phenyl⟩ | —H |
| 20 | —CH$_3$ | 1 | —CH$_3$ | 1 | 0 | —CH$_3$ | —H |
| 21 | —OCH$_3$ | 1 | —OCH$_3$ | 1 | 1 | –⟨phenyl⟩ | —H |

The charge generation layer may be obtained, for instance, by preparing a coating solution by dissolving or dispersing the titanium phthalocyanine compound of the general formula I singly or together with the binder polymer in an appropriate solvent and then coating it to dry on an electroconductive support.

The charge generation layer is usually coated in a thickness in the 0.1 to 1 μm range.

The solvent for preparing the coating solution may include a basic solvent such as butyl amine and ethylene diamine, ethers such as tetrahydrofuran, methyltetrahydrofuran, 1,4-dioxane and diethylene glycol dimethyl ether; ketones such as methyl ethyl ketone and cyclohexanone; aromatic hydrocarbons such as toluene and xylene; non-protonic polar solvents such as N,N-dimethylformamide, acetonitrile, N-methylpyrrolidone and dimethyl sulfoxide; alcohols such as methanol, ethanol and isopropanol; esters such as ethyl acetate, methyl formate and methyl cellosolve acetate; and chlorinated hydrocarbons such as dichloroethane and chloroform. These solvents may be used singly or as a mixture of two or more of them. If the binder polymer is used, the solvents are desired to be able to dissolve the polymer.

As the electroconductive support on which the charge generation layer is coated, any of well-known electroconductive supports employed in the electrophotographic photoreceptor can be used. Specific examples may include, for example, drums or sheets of metals such as aluminum and copper, or laminates of foils and vapor-deposition products of these metals. Furthermore, plastic films, plastic drums, paper or paper tubes which are conductive by coating electroconductive substances such as metal powder, carbon black, copper iodide and polymeric electrolytes together with an appropriate binder can also be mentioned. Furthermore, there can also be mentioned those plastic sheets or drums which become conductive by the incorporation of electroconductive materials such as metal powder, carbon black and carbon fibers.

The charge transport layer is formed by coating on the charge generation layer as described above. On the contrary, the charge transport layer may be formed on the electroconductive substrate and the charge generation layer may be coated thereover. However, since the thickness of the charge generation layer is thin, the former type is usually employed for protecting the charge generation layer from abrasion or contamination.

The charge transport layer serves to transport charge carrier generated in the charge generation layer and contains a charge carrier transporting medium which is the hydrazone compound as described above. The charge carrier transporting medium is usually incorporated in an amount of from 0.2 to 1.5 times by weight and, preferably, from 0.3 to 1.2 times by weight of the binder polymer.

The same polymer as incorporated into the charge generation layer may be used as the binder polymer of the charge transport layer, and it is dissolved together with the charge carrier transporting medium into a solvent to prepare a coating solution, which is then coated and dried to form the charge transport layer. The thickness of the charge transport layer is from 5 to 50 μm and, preferably, from 10 to 30 μm.

The photosensitive layer of the electrophotographic photoreceptor according to this invention may, of course, additionally contain a well-known sensitizer. A preferred sensitizer may include Lewis acids and dye pigments forming a charge transfer complex with the organic photoconductive substance. The Lewis acid may include electron accepting compounds, for example, quinones such as chloranil, 2,3-dichloro-1,4-naphthoquinone, 2-methylanthraquinone, 1-nitroanthraquinone, 1-chloro-5-nitroanthraquinone, 2-chloroanthraquinone and phenanthrenequinone; aldehydes such as 4-nitrobenzaldehyde; ketones such as 9-benzoylanthracene, indandione, 3,5-dinitrobenzophenone and 3,3',5,5'-tetranitrobenzophenone; acid anhydrides such as phthalic anhydride and 4-chloronaphthalic acid anhydride; cyano compounds such as tetracyanoethylene, terephthalal malononitrile, 4-nitrobenzal malononitrile and 4-(p-nitrobenzoyloxy)benzal malononitrile; and phthalides such as 3-benzal phthalide, 3-(α-cyano-p-nitrobenzal)phthalide and 3-(α-cyano-p-nitrobenzal)-4,5,6,7-tetrachloro phthalide. The dyes may include, for example, triphenyl methane dyes such as methyl violet, brilliant green and crystal violet, thiazine dye such as methylene blue, quinone dyes such as quinizarin, cyanine dyes and pyrylium salt, thiapyrylium salt and benzopyrylium salt and others.

Further, the photosensitive layer of the electrophotographic photoreceptor according to this invention may also be incorporated with a well-known plasticizer for improving the film-forming property, flexibility and mechanical strength. The plasticizer may include, for example, phthalic acid ester, phospholic acid ester, epoxy compound, chlorinated paraffin, chlorinated aliphatic acid ester and aromatic compound such as methyl naphthalene. The photoreceptor may also have, as required, an adhesive layer, an intermediate layer or a transparent insulation layer.

The photoreceptor produced from the phthalocyanine compound according to this invention has an extremely high sensitivity to the incandescent light as well, shows less potential variation after repeating use and has an extremely high spectral sensitivity within a range from 750 to 900 nm.

Accordingly, the photoreceptor is suitable for the laser printer using semiconductor laser beam as the optical source which have been greatly developed recently.

This invention will be explained more specifically on the method of preparing the photoreceptor from the materials as described above and on the electrical properties thereof, while referring to examples. It should, however, be noted that this invention is no way limited to the following examples so long as it is within the scope of the invention.

In Examples, "parts" means "parts by weight".

Preparation Example 1

Phthalodinitrile (4.6 parts) was added into 25 parts of α-chloronaphthalene and dissolved at 120° C. Then, 1.7 g of TiCl₄ was dropped and continuously stirred at 150° C. for 30 minutes. Then, the reaction temperature was gradually increased and the stirring was continued at 220° C. for two hours.

After the reaction was over, the reaction solution was left to cool and filtered while hot when the temperature of the reaction system was lowered to 100° C. Then the filtrate was subjected to methanol heat suspension, boiling water suspension and heat suspension with N-methylpyrrolidone at 120° C. for one hour, which was then filtered while hot, subjected to methanol heat suspension again and filtered and then dried at a reduced pressure to obtain 2 parts of blue powder (Compound No. 1).

Elemental analytical values for Compound No. 1 are as described below.

|  |  | C % | H % | N % | Cl % |
|---|---|---|---|---|---|
| Calculated value | PcTiCl₂ | 60.87 | 2.56 | 17.75 | 11.23 |
|  | PcTiO | 66.68 | 2.78 | 19.45 | — |
| Measured value |  | 66.85 | 3.01 | 19.53 | 0.49 |

As the result of the elemental analysis shown above, it can be seen that the titanium phthalocyanine compound obtained in Preparation Example 1 is a mixture of PcTiCl₂ and PcTiO, almost of which being PcTiO.

Titanium phthalocyanine of Compounds No. 2–No. 12 shown in Table 3 were synthesized according to the same procedures as in Preparation Example 1.

TABLE 3

| Compound No. | X | m | Y | n | Remarks |
|---|---|---|---|---|---|
| 2 | —H | 0 | O | 1 | elemental analytical value: Cl content 0.5% |
| 3 | —H | 0 | O | 1 | elemental analytical value: Cl content 5% |
| 4 | —H | 0 | OC₄H₉ | 2 |  |
| 5 | —CH₃ | 1 | O | 1 |  |
| 6 | —OH | 1 | O | 1 |  |
| 7 | 3-NO₂ | 1 | O | 1 |  |
| 8 | 4-NO₂ | 1 | O | 1 |  |
| 9 | —OCH₃ | 4 | Cl | 2 |  |
| 10 | Cl | 4 | O | 1 |  |
| 11 | —OCH₂—⌬ | 4 | O | 1 |  |
| 12 | —CN | 1 | O | 1 | elemental analytical value: Br content 0.3% |

EXAMPLE 1

0.4 parts of the titanium phthalocyanine compound of Compound No. 1 was dispersed by a sand grinder with 30 parts of 4-methoxy-4-methylpentanone-2, to which was added 0.2 parts of polyvinyl butyral. The thus obtained dispersed mixture of the titanium phthalocyanine compound was coated with a film applicator and then dried to a dry film thickness of 0.3 g/m² on an aluminum layer which had been vapor-deposited on a polyester film of 100 μm thickness. Onto the thus obtained charge generation layer, a solution prepared by dissolving 90 parts of the hydrazone compound of Compound No. 19 shown in Table 2 and 100 parts of a methacrylic resin (DIANAL BR-85, trademark of the product manufactured by Mitsubishi Rayon K.K.) into 550 parts of toluene was coated so that the film dry thickness of 13 μm was attained to form a charge transport layer. In this way, an electrophotographic photoreceptor having a photosensitive layer composed of two layers was obtained.

The value of half-decay exposure intensity ($E_{\frac{1}{2}}$) of the photosensitive material was measured as the sensitivity thereof and shown in Table 1.

The half-decay exposure intensity of the photoreceptor was determined using an electrostatic paper analyzer (Model SP-428, manufactured by Kawaguchi Denki Seisakusho). The photoreceptor was at first charged with corona discharge at −5.5 KV in the dark and then exposed to incandescent light at a illumination of 5 lux and measured the exposure intensity $E_{\frac{1}{2}}$ (lux.sec) required till the surface potential decayed to one-half of the initial surface potential.

The spectral sensitivity was determined as the half-decay exposure energy sensitivity (μJ/cm²) by irradiating a light at 0.4 μW/cm² separated through a spectrofilter.

For estimating the cyclic characteristics, the photoreceptor is charged at −5.5 KV and irradiated with a light of 200 lux for 2 sec. After repeating the procedure at 2.4 sec/cycle, the charged potential, the residual potential and the degradation in the sensitivity were measured. The results are shown in the following tables.

| Initial charged voltage V | Incandescent light sensitivity $E_{\frac{1}{2}}$ (lux · sec) | Residual potential V | Wavelength at the maximum spectrum sensitivity nm | Maximum sensitivity μJ/cm² |
|---|---|---|---|---|
| −535 | 0.97 | −15 | 800 | 0.4 |

| | Repeating Characteristics | | |
|---|---|---|---|
| | Charged potential (V) | Residual potential (V) | Sensitivity (lux · sec) |
| Initial | −520 | −17 | 1.0 |
| After 2,000 cycles | −510 | −20 | 1.05 |

Since electrical characteristics are preferred and, among all, the residual potential value is low, the photoreceptor is found to be satisfactory.

EXAMPLE 2

A charge generation layer was prepared quite in the same procedures as in Example 1 from the titanium phthalocyanine compound of Compound No. 1. Onto the thus obtained charge generation layer, a solution prepared by dissolving 90 parts of the hydrazone compound of Compound No. 16 shown in Table 1 and 100 parts of polycarbonate (NOVAREX 7030A, trade name of the product manufactured by Mitsubishi Chemical Industries Ltd.) into 600 parts of tetrahydrofuran was coated so as to obtain 13 μm of dry film thickness to prepare a charge transport layer.

The initial property and the repeating property of the thus obtained electrophotographic photoreceptor were determined in the same procedures as in Example 1. The results are shown in the following tables.

| Initial charged potential V | Incandescent light sensitivity $E_{\frac{1}{2}}$ (lux · sec) | Residual potential V | Wavelength at the maximum spectrum sensitivity nm | Maximum sensitivity μJ/cm² |
|---|---|---|---|---|
| −550 | 0.8 | −10 | 800 | 0.35 |

| | Repeating Characteristics | | |
|---|---|---|---|
| | Charged potential (V) | Residual potential (V) | Sensitivity (lux · sec) |
| Initial | −550 | −15 | 0.8 |
| After 10,000 cycles | −560 | −22 | 0.95 |

The electrical properties above are excellent and, among all, the residual potential value is extremely low, and moreover, the stability under the repeating use is found to be satisfactory.

EXAMPLES 3–13

Photoreceptors comprising the substances shown in the following Table 4 were produced in accordancde with the procedures in Examples 1 and 2 and electrical properties were measured in the same manner as in Example 1.

TABLE 4

| Example No. | Titanium phthalocyanine compound | Hydrazone compound | Charged potential (V) | Sensitivity (lux · sec) |
|---|---|---|---|---|
| 3 | Compound No. 2 | Compound No. 13 | −523 | 1.2 |
| 4 | Compound No. 3 | Compound No. 16 | −498 | 1.8 |
| 5 | Compound No. 5 | Compound No. 18 | −513 | 0.8 |
| 6 | Compound No. 9 | Compound No. 15 | −506 | 0.9 |
| 7 | Compound No. 4 | Compound No. 16 | −479 | 0.8 |
| 8 | Compound No. 7 | Compound No. 14 | −556 | 0.9 |
| 9 | Compound No. 9 | Compound No. 21 | −581 | 0.8 |
| 10 | Compound No. 10 | Compound No. 20 | −525 | 0.9 |
| 11 | Compound No. 1 | Compound No. 17 | −563 | 0.8 |
| 12 | Compound No. 12 | Compound No. 19 | −498 | 0.9 |
| 13 | Compound No. 6 | Compound No. 13 | −486 | 1.0 |

What is claimed is:

1. A dual layer photoreceptor for use in electrophotography, wherein a charge transport layer is laminated on a charge generation layer overlaid on an electroconductive substrate, characterized in that the charge generation layer contains a titanium phthalocyanine compound represented by the following general formula I:

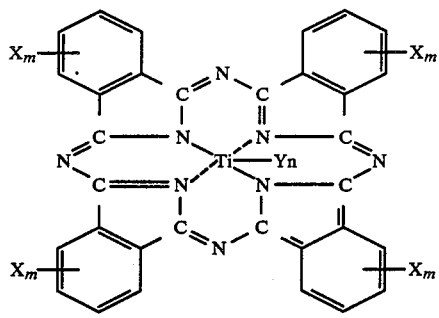

wherein X represents a hydrogen atom, a lower alkyl group, a lower alkoxy group, an allyloxy group, a nitro group, a cyano group, a hydroxy group, a benzyloxy group or a halogen atom, Y represents a halogen atom, an alkoxy group or an oxygen atom, n represents an integer of 1 or 2 and m represents an integer of 0 to 4, and a binder polymer, and that the charge transport layer contains a hydrazone compound and a binder polymer.

2. The dual layer photoreceptor for use in electrophotography as claimed in claim 1, wherein the binder polymer incorporated into the charge generation layer and the charge transport layer is a polymer or copolymer of vinyl compound, polyester, polycarbonate, polysulfone, polyvinyl butyral, phenoxy resin, cellulose resin, urethane resin or epoxy resin.

3. The dual layer photoreceptor for use in electrophotography as claimed in claim 1 or 2, wherein the hydrazone compound is represented by the following general formula IIA or IIB:

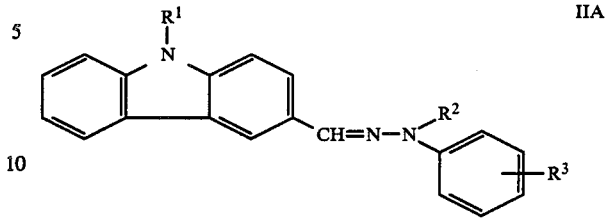

wherein $R^1$ represents an alkyl group, a substituted alkyl group, an aralkyl group, an allyl group or an alkoxy carbonyl ethyl group, $R^2$ represents an alkyl group, an allyl group, a substituted alkyl group, a phenyl group, a naphthyl group or an aralkyl group, and $R^3$ represents a hydrogen atom, an alkyl group, an alkoxy group or a halogen atom; and

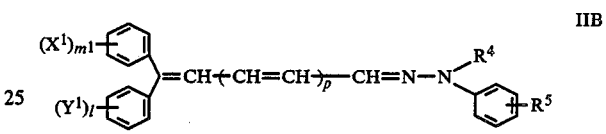

wherein $X^1$, $Y^1$ and $R^5$ represent a hydrogen atom, a lower alkyl group, a dialkyl amino group, a lower alkoxy group, a phenoxy group or an allyl alkoxy group, respectively, $R^4$ represents a hydrogen atom, a lower alkyl group, an allyl group, a phenyl group or an aralkyl group, $m^1$ and $l$ represent an integer of 1 or 2, respectively, and p represents an integer of 0 or 1.

* * * * *

REEXAMINATION CERTIFICATE (3152nd)

United States Patent [19]
Suzuki et al.

[11] B1 4,725,519
[45] Certificate Issued Mar. 11, 1997

[54] DUAL LAYER ELECTROPHOTOGRAPHIC PHOTORECEPTOR COMPRISES TITANIUM PHTHALOCYANINE CHARGE TRANSPORT MATERIALS

[75] Inventors: Tetsumi Suzuki, Isehara; Tetsuo Murayama, Machida; Hitoshi Ono, Yokohama; Shigenori Otsuka, Omiya; Mamoru Nozomi, Yokohama, all of Japan

[73] Assignee: Mitsubishi Chemical Corporation, Tokyo, Japan

Reexamination Request:
No. 90/004,039, Nov. 28, 1995

Reexamination Certificate for:
Patent No.: 4,725,519
Issued: Feb. 16, 1988
Appl. No.: 782,684
Filed: Oct. 1, 1985

[30] Foreign Application Priority Data
Nov. 1, 1984 [JP] Japan .................. 59-230982

[51] Int. Cl.$^6$ .................. G03G 5/06; G03G 5/047
[52] U.S. Cl. .................. 430/58; 430/78; 430/79
[58] Field of Search .................. 430/58, 59, 78

[56] References Cited

U.S. PATENT DOCUMENTS

| | | | |
|---|---|---|---|
| 4,278,747 | 7/1981 | Murayama et al. | 430/82 |
| 4,338,388 | 7/1982 | Sakai et al. | 430/59 |
| 4,367,273 | 1/1983 | Murayama et al. | 430/56 |
| 4,385,106 | 5/1983 | Sakai | 430/59 |
| 4,399,207 | 8/1983 | Sakai et al. | 430/58 |
| 4,399,208 | 8/1983 | Takasu et al. | 430/59 |
| 4,407,919 | 10/1983 | Murayama et al. | 430/58 |
| 4,448,868 | 5/1984 | Suzuki et al. | 430/58 |
| 4,477,549 | 10/1984 | Fujimaki et al. | 430/54 |
| 4,485,160 | 11/1984 | Suzuki et al. | 430/59 |
| 4,851,314 | 7/1989 | Yoshihara | 430/59 |

FOREIGN PATENT DOCUMENTS

| | | |
|---|---|---|
| 51-117637 | 10/1976 | Japan . |
| 56-128951 | 10/1981 | Japan . |
| 57-054942 | 4/1982 | Japan . |
| 57-064244 | 4/1982 | Japan . |
| 57-147641 | 9/1982 | Japan . |
| 58-140068 | 8/1983 | Japan . |
| 58-156941 | 9/1983 | Japan . |
| 58-181049 | 10/1983 | Japan . |
| 59-031965 | 2/1984 | Japan . |
| 59-49544 | 3/1984 | Japan . |
| 59-166959 | 9/1984 | Japan . |
| 59-171959 | 9/1984 | Japan . |
| 59-182455 | 10/1984 | Japan . |

OTHER PUBLICATIONS

Technical Research Report of the Institute of Electronics and Communication Engineers of Japan, vol. 83, No. 197 (Nov. 25, 1983).

*Primary Examiner*—Roland E. Martin

[57] ABSTRACT

A dual layer photoreceptor for use in electrophotography, wherein a charge transport layer containing a hydrazone compound and a binder polymer is laminated on a charge generation layer containing a titanium phthalocyanine compound of the formula:

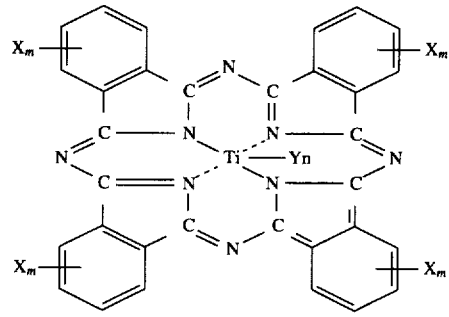

wherein X represents hydrogen atom, lower alkyl group, lower alkoxy group, allyloxy group, nitro group, cyano group, hydroxy group, benzyloxy group or halogen atom, Y represents halogen atom, alkoxy group or oxygen atom, n represents an integer of 1 or 2 and m represents an integer of 0 to 4, and a binder polymer, formed on an electroconductive substrate.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–3 is confirmed.

New claims 4–6 are added and determined to be patentable.

*4. The dual layer photoreceptor for use in electrophotography as set forth in claim 1, wherein Y is an oxygen atom.*

*5. The dual layer photoreceptor for use in electrophotography as set forth in claim 1, wherein n is 1.*

*6. The dual layer photoreceptor for use in electrophotography as set forth in claim 1, wherein Y is an oxygen atom and n is 1.*

* * * * *